United States Patent [19]

Baba et al.

[11] Patent Number: 4,483,939

[45] Date of Patent: Nov. 20, 1984

[54] PROCESS FOR PRODUCING POLYOLEFIN

[75] Inventors: Kazuo Baba; Kizuku Wakatsuki; Toshimi Sato, all of Ichihara; Tadashi Hikasa, Chiba, all of Japan

[73] Assignee: Sumitomo Chemical Company, Limited, Osaka, Japan

[21] Appl. No.: 406,449

[22] Filed: Aug. 9, 1982

[30] Foreign Application Priority Data

Aug. 12, 1981 [JP] Japan ................................ 56-127223

[51] Int. Cl.$^3$ ............................. C08F 4/64; C08F 4/68
[52] U.S. Cl. .................................... 502/127; 502/132; 526/124; 526/142
[58] Field of Search ....................... 252/429 B, 431 R; 502/127, 132

[56] References Cited

U.S. PATENT DOCUMENTS 3,135,809  6/1964  Bosmajian .................. 252/429 A X
3,412,174  11/1968 Kroll .......................... 252/429 B X
4,143,223  3/1979  Toyota et al. .............. 252/429 B X
4,394,292  7/1983  Yamada et al. ................. 252/429 B

FOREIGN PATENT DOCUMENTS 133408 10/1980 Japan .
144006 11/1980 Japan .

Primary Examiner—Patrick Garvin
Attorney, Agent, or Firm—Stevens, Davis, Miller & Mosher

[57] ABSTRACT

A process for producing a polyolefin, which comprises polymerizing an olefin in the presence of a catalyst system comprising:
  (a) a solid catalyst component obtained by supporting a titanium compound and/or a vanadium compound on a solid product derived from the reaction of a phenol, an aromatic carboxylate ester, and a solid reaction product of an organomagnesium compound and an aryloxyaluminum compound represented by the general formula Al(OR$^1$)$_3$, wherein R$^1$ represents an aryl group having 6 to 20 carbon atoms; and
  (b) an organoaluminum compound.

11 Claims, No Drawings

PROCESS FOR PRODUCING POLYOLEFIN

The present invention relates to a process for producing a polyolefin by polymerizing or copolymerizing olefins with a high-activity catalyst. More particularly, it relates to a process for producing a highly stereoregular olefin polymer or copolymer (hereinafter such an olefin polymer or copolymer is referred to simply as olefin polymer) by using a catalyst of extremely high activity.

It is well known heretofore that a catalyst system comprising a transition metal compound of Group IVb to Group VIb and an organometallic compound of a metal of Group I to Group III of the periodic table (i.e. a so-called Ziegler catalyst) is effective for the polymerization of olefins. Many studies have been performed concerning supported catalysts consisting of transition metal compounds supported on various carriers. The carriers which have been found to be effective are inorganic compounds such as oxides, hydroxides, chlorides, carbonates of metals and silicon, mixtures thereof, and double salts. Of these inorganic carriers, magnesium compounds such as magnesium halides (Japanese Patent Publication Nos. 12,105/64, 41,676/72, etc.) and alkoxy- or aryloxymagnesiums [Japanese Patent Publication Nos. 34,098/71, and 42,137/72; Japanese Patent Application "Kokai" (Laid-open) Nos. 119,982/74, 147,688/77, 133,408/80 and 144,006/80] have been found to be particularly effective. The known catalyst systems using these carriers have relatively high but not sufficiently high activities and, in addition, the polymers which are formed are unsatisfactory in the degree of stereoregularity required, especially for the polymers of α-olefins having three or more carbon atoms. Moreover, these catalyst systems generally give polymers of broad particle size distribution and do not give polymers having a controlled particle size of narrow distribution. Although there have been many attempts to improve the catalyst in these respects, the improvements obtained have not been satisfactory.

Further, in the production of olefin polymers it is desirable that the polymers contain the smallest possible amount of catalyst residues, because such residues cause various problems associated with stability and processability of the polymers. As a consequence, it is necessary to install an aftertreatment unit for the removal of catalyst residues and for the stabilization of olefin polymers. This disadvantage can be ameliorated if it is possible to increase the catalyst activity expressed in terms of the weight of polymer formed per unit weight of the catalyst. If the installation for removing the catalyst residues becomes unnecessary (development of a so-called nondeashing process), the production cost of the polyolefin can be reduced. On the other hand, when an olefin is polymerized by the slurry method or the gas phase method, the bulk density, average particle size, and particle size distribution of the resulting polymer are important factors which affect productivity. The improvement of these factors will result in a reduction in adhesion of polymer on the wall of the polymerization vessel; an improvement in utilization efficiency of the reactor; and an improvement in efficiencies of transportation, drying and granulating, thereby leading to an increase in productivity and a reduction in production cost. Even the powder molding which eliminates the granulation step might become possible. However, the olefin polymers formed by polymerization with a supported catalyst generally have the disadvantages of low bulk density, small average particle size, and broad particle size distribution. Accordingly, the development of a supported type catalyst which can be used in the nondeashing process and which is capable of producing an olefin polymer having a large bulk density and a narrow particle size distribution is of great industrial value and is very important.

The present inventors have previously found that a highly active catalyst for the formation of a highly stereoregular olefin polymer is obtained by supporting a titanium compound on a carrier formed by the reaction of a solid organomagnesium halide, a phenol, and an aromatic carboxylate ester [Japanese Patent Application "Kokai" (Laid-open) No. 133,408/80]. They have continued extensive research on said highly active and industrially advantageous catalyst and, as a result, found a method for obtaining a solid carrier useful in preparing a supported catalyst which has a high activity as expressed either per unit weight of the transition metal or per unit weight of the solid catalyst component so that the catalyst may be used in the nondeashing process. Moreover, the polymer produced with this catalyst has a narrow particle size distribution and forms a slurry of desirable properties. The present invention has been accomplished based on the above finding.

An object of the present invention is to provide a process for producing a highly stereoregular olefin polymer having a narrow particle size distribution and capable of forming a slurry of desirable properties by using a high-activity catalyst.

Another object of the present invention is to provide a catalyst system which has a high activity either per unit weight of the transition metal or per unit weight of the solid catalyst component and which is capable of producing the above-said olefin polymer, so that it may be adaptable to the nondeashing process.

Other objects and advantages of the present invention will become apparent from the following description.

According to the present invention there is provided a process for producing a polyolefin, which comprises polymerizing an olefin in the presence of a catalyst system comprising (a) a solid catalyst component obtained by supporting a titanium compound and/or a vanadium compound on a solid product derived from the reaction of a phenol, an aromatic carboxylate ester, and a solid reaction product of an organomagnesium compound and an aryloxyaluminum compound represented by the general formula $Al(OR^1)_3$, wherein $R^1$ represents an aryl group having 6 to 20 carbon atoms, and (b) an organoaluminum compound.

The organomagnesium compound used in the synthesis of the solid carrier material according to the present invention may be any of those formed by the reaction between an organic halogen compound and metallic magnesium. Especially suitable are Grignard compounds represented by the general formula $R^2MgX$, wherein $R^2$ represents a hydrocarbon group having 1 to 20 carbon atoms and X represents a halogen atom, and organomagnesium compounds represented by the general formula $R^2_2Mg$. In the above formulas, the hydrocarbon group, $R^2$, is an alkyl, aryl, aralkyl, or alkenyl group having 1 to 20 carbon atoms, such as, for example, methyl, ethyl, n-propyl, isopropyl, n-butyl, sec-butyl, tert-butyl, n-pentyl, isopentyl, n-hexyl, n-octyl, 2-ethylhexyl, phenyl, and benzyl; and X is chlorine, bromine, or iodine. As examples of Grignard compounds mention may be made of ethylmagnesium chloride, ethylmagnesium bromide, ethylmagnesium iodide, n-propylmagnesium chloride, n-propylmagnesium bromide, n-butylmagnesium chloride, n-butylmagnesium bromide, n-pentylmagnesium chloride, phenylmagnesium chloride, and phenylmagnesium bromide. Examples of dialkylmagnesium compounds include diethylmagnesium, di-n-propylmagnesium, di-n-butylmagnesium, di-n-pentylmagnesium, and diphenylmagnesium.

The preferred solvents used in the synthesis of the above-mentioned organomagnesium compounds are ethers such as diethyl ether, di-n-propyl ether, diisopropyl ether, di-n-butyl ether, diisobutyl ether, di-n-amyl ether, diisoamyl ether, di-n-hexyl ether, di-n-octyl ether, diphenyl ether, dibenzyl ether, phenetole, anisole, tetrahydrofuran, and tetrahydropyrane. It is also possible to use hydrocarbons such as hexane, heptane, octane, cyclohexane, methylcyclohexane, benzene, toluene, and xylene; and mixtures of ether-type and hydrocarbon-type solvents. In the synthesis of a solid carrier, the organomagnesium compound is preferably used as a solution in ethers or as an ether complex. It is most preferable to use a Grignard compound represented by RMgCl in the form of ether solution or ether complex.

As examples of aryloxyaluminum compounds represented by the general formula Al(OR$^1$)$_3$, wherein R$^1$ represents an aryl group having 6 to 20 carbon atoms, mention may be made of aluminum triphenoxide, aluminum tri-o-cresoxide, aluminum tri-n-cresoxide, aluminum tri-p-cresoxide, aluminum tri-2,6-dimethylphenoxide, aluminum tri-2,3-dimethylphenoxide, aluminum tri-2,4-dimethylphenoxide, aluminum tri-3,5-dimethylphenoxide, aluminum tri-o-ethylphenoxide, aluminum tri-m-ethylphenoxide, aluminum tri-p-ethylphenoxide, aluminum tri-2,6-di-tert-butylphenoxide, di-o-cresoxyaluminum phenoxide, diphenoxyaluminum o-cresoxide, and aluminum trinaphthoxide. These compounds are synthesized by known methods. For instance, they are easily prepared by a reaction between a trialkylaluminum and a phenol or between aluminum trimethoxide and a phenol.

The phenols used in the reaction with a solid reaction product of an organomagnesium compound and Al(OR$^1$)$_3$ are preferably monohydric phenols such as, for example, phenol, o-cresol, m-cresol, p-cresol, 2,6-dimethylphenol, 2,3-di-methylphenol, 2,4-dimethylphenol, 2,5-dimethylphenol, 3,4-dimethylphenol, 3,5-dimethylphenol, o-ethylphenol, m-ethylphenol, p-ethylphenol, p-propylphenol, p-butylphenol, 2,6-di-tert-butylphenol, 2,6-di-tert-butyl-4-methylphenol, and α-naphthol. Of these phenols having no substituent at the ortho position are more preferable.

Examples of particular aromatic carboxylate esters used in the reaction with a solid reaction product of an organomagnesium compound and Al(OR$^1$)$_3$ are methyl benzoate, ethyl benzoate, propyl benzoate, butyl benzoate, phenyl benzoate, methyl p-methoxybenzoate, ethyl p-methoxybenzoate, propyl p-methoxybenzoate, butyl p-methoxybenzoate, phenyl o-methoxybenzoate, methyl p-ethoxybenzoate, cyclohexyl p-ethoxybenzoate, methyl p-methylbenzoate, butyl p-methylbenzoate, cyclohexyl p-methylbenzoate, ethyl o-methylbenzoate, phenyl p-butylbenzoate, diethyl phthalate, di-2-ethylhexyl phthalate, and dimethyl terephthalate. Preferable of these are compounds represented by the general formula

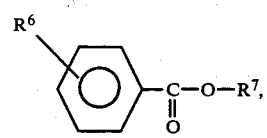

wherein R$^6$ and R$^7$ represent a hydrocarbon groups having 1 to 10 carbon atoms. Examples of preferable compounds are methyl benzoate, ethyl benzoate, propyl benzoate, butyl benzoate, phenyl benzoate, methyl p-methylbenzoate, butyl p-methylbenzoate, cyclohexyl p-methylbenzoate, ethyl o-methylbenzoate and phenyl p-butylbenzoate.

The titanium compounds and/or vanadium compounds to be supported on a carrier are titanium compounds represented by the general formula Ti(OR$^3$)$_m$X$_{4-m}$, wherein R$^3$ represents a hydrocarbon group having 1 to 20 carbon atoms, X represents a halogen atom, and m is a number satisfying the formula $0 \leq m \leq 4$; vanadium tetrachloride; and vanadium oxytrichloride. As examples of said titanium compounds, there may be listed titanium tetrachloride, titanium tetrabromide, titanium tetraiodide, tetraethoxytitanium, tetra-n-propoxytitanium, tetraisopropoxytitanium, tetra-n-butoxytitanium, tetrakis(2-ethylhexyl) titanate, tetrastearyl titanate, ethoxytitanium trichloride, diethoxytitanium dichloride, triethoxytitanium chloride, phenoxytitanium trichloride, diphenoxytitanium dichloride, triisopropoxytitanium chloride, n-butoxytitanium trichloride, di-n-butoxytitanium dichloride, tri-n-butoxytitanium chloride, ethoxytitanium tribromide, diethoxytitanium dibromide, triethoxytitanium bromide, n-propoxytitanium tribromide, di-n-butoxytitanium dibromide, and tri-n-butoxytitanium bromide. These titanium compounds are used either alone or in mixtures.

The synthesis of the solid catalyst component is carried out throughout under an inert atmosphere of nitrogen, argon, or the like. The reaction of an organomagnesium compound and an aryloxyaluminum compound is preferably conducted in a solvent at a temperature of $-30°$ to $200°$ C., preferably $-10°$ to $150°$ C. The reaction is allowed to proceed by adding dropwise an aryloxyaluminum compound, as such or dissolved or suspended in a suitable solvent, to a solution of an organomagnesium compound, or vice versa. The reaction time should be sufficiently long for the reaction to be competed. The time required is usually 10 minutes or more, preferably 30 minutes to 5 hours. The molar ratio of an organomagnesium compound to an aryloxyaluminum compound is in the range of from 1:10 to 10:1, preferably from 1:2 to 5:1. The solvents used in the reaction are aliphatic hydrocarbons such as pentane, hexane, heptane, and octane; aromatic hydrocarbons such as benzene, toluene, and xylene; alicyclic hydrocarbons such as cyclohexane and cyclopentane; and ethers represented by the general formula R$^4$—O—R$^5$, wherein R$^4$ and R$^5$ each represents a hydrocarbon group having 1 to 20 carbon atoms, or R$^4$ and R$^5$ may jointly form a ring. Examples of such ethers are diethyl ether, di-n-propyl ether, diisopropyl ether, di-n-butyl ether, di-sec-butyl ether, di-n-amyl ether, diisoamyl ether, di-n-hexyl ether, di-n-octyl ether, diphenyl ether, dibenzyl ether, anisole, phenetole, methyl benzyl ether, dibenzyl ether, tetrahydropyrane, and tetrahydrofuran. These solvents are used either alone or in combinations.

The solid reaction product is separated from the reaction mixture and used in the reaction with a phenol and an aromatic carboxylate ester. In actual practice, the solid product separated by filtration is used as such or after thorough washing with a purified inert hydrocarbon solvent, without drying or after drying. A solid reaction product containing 0.01 to 2% by weight of aluminum is especially preferred.

The solid reaction product thus obtained is further reacted with a phenol and an aromatic carboxylate ester in a solvent at $-30°$ to 200° C., preferably $-10°$ to 150° C., to obtain the catalyst carrier. The reaction of the three reactants can be carried out either in one step or in two steps in which the solid reaction product is first reacted with a phenol followed by the reaction with an aromatic carboxylate ester; or, alternatively, the solid reaction product is first reacted with an aromatic carboxylate ester and then with a phenol. The reaction time should be sufficient for completion of the reaction. The time required is usually 10 minutes or more, preferably 30 minutes to 2 hours. The proportions of a phenol and an aromatic carboxylate ester for 1 g of the solid reaction product are 10 to 200, preferably 30 to 150, mmoles of phenol and 0.1 to 20, preferably 1 to 5, mmoles of aromatic carboxylate ester. The solvents used in the reaction are aliphatic hydrocarbons such as pentane, hexane, heptane, and octane; aromatic hydrocarbons such as benzene, toluene, and xylene; and alicyclic hydrocarbons such as cyclohexane and cyclopentane. After completion of the reaction, the solid reaction product is collected by filtration and employed as the carrier directly, or after thorough washing with a purified inert hydrocarbon solvent and subsequent drying or without drying. The solid product thus formed is an addition product of a magnesium compound with a phenol and an aromatic carboxylate ester. The solid product preferable for use as the solid carrier according to the present invention shows a stretch vibration of the phenolic hydroxyl group at 3200–3600 cm$^{-1}$ in the infrared absorption spectrum.

In order to prepare the solid catalyst component, a titanium compound and/or a vanadium compound is supported on the carrier preferably by the immersion method in which the titanium compound and/or the vanadium compound is contacted with the carrier either in an inert solvent or without using a solvent. Examples of inert solvents are hydrocarbons such as heptane, hexane, benzene and toluene; and hydrogenated hydrocarbons such as dichloroethane, chlorobenzene and o-dichlorobenzene. The temperature of contact is preferably in the range of from room temperature to 150° C. After the titanium and/or vanadium compound has been supported, the product is separated by filtration and preferably washed thoroughly with a purified hydrocarbon diluent. The washed product is used as such or after drying. It is desirable to adjust the supported amount of a titanium and/or vanadium compound so that the content of the titanium and/or vanadium atom of the supported catalyst may become generally 0.01 to 30, preferably 0.1 to 10, % by weight. The resulting solid catalyst component has a favorable particle size and a narrow particle size distribution and exhibits superior catalytic performance.

The organoaluminum compounds which, together with the above-mentioned solid catalyst component, form a catalyst system in the polymerization reaction are trialkylaluminums such as triethylaluminum, tri-n-propylaluminum, tri-n-butylaluminum, and tri-n-hexylaluminum; dialkylaluminum monohalides such as diethylaluminum monochloride, di-n-propylaluminum monochloride, di-n-butylaluminum monochloride, and di-n-hexylaluminum monochloride; alkylaluminum dihalides such as ethylaluminum dichloride, n-propylaluminum dichloride, n-butylaluminum dichloride, and n-hexylaluminum dichloride; alkylaluminum sesquihalides such as ethylaluminum sesquichloride, n-propylaluminum sesquichloride, n-butylaluminum sesquichloride, and n-hexylaluminum sesquichloride; and alkylaluminum alkoxides such as dimethylaluminum methoxide, diethylaluminum ethoxide, diethylaluminum butoxide, and dibutylaluminum ethoxide. These organoaluminum compounds are used either alone or in mixtures of two or more.

In the polymerization of an $\alpha$-olefin having 3 or more carbon atoms according to the present invention, it is desirable to use a generally used electron donating compound as the third component of the catalyst system in order to improve the stereoregularity of the resulting polymer. Examples of such electron donating compounds are amines, amides, esters, ethers, ketones, nitriles, phosphites, phosphines, and sulfides. Of these, preferred are carboxylate esters, particularly aromatic carboxylate esters such as those used in the reaction with the aforementioned solid reaction products. The amount of electron donating compound used is 0.01 to 1 mole, preferably 0.1 to 0.6 mole, for 1 mole of the organo-aluminum compound, i.e. the catalyst component (b).

The olefins suitable for the process of the present invention include those having 2 to 15 carbon atoms such as ethylene, propylene, butene-1, butadiene, 4-methylpentene-1, hexene-1, vinylcyclohexane, styrene, and divinylbenzene. The polymerization can be carried out by the known slurry, gas phase, or solvent methods which are customarily used. It is desirable to employ a polymerization temperature of from room temperature to 200° C. and a pressure of from atmospheric to about 100 atmospheres, though the polymerization proceeds at higher temperatures and pressures. A molecular weight regulator such as, for example, hydrogen can be used. The polymerization may be carried out either continuously or batchwise.

The inert solvents used as polymerization media include aliphatic hydrocarbons such as propane, butane, pentane, hexane, heptane, and octane; alicyclic hydrocarbons such as cyclohexane and cycloheptane; and aromatic hydrocarbons such as benzene, toluene, and xylene. These solvents are used either alone or in mixtures. It is also feasible to use a spent B-B fraction as the polymerization medium.

The present invention is further illustrated below in detail with reference to Examples, but the invention is not limited thereto.

EXAMPLE 1

(1) Synthesis of magnesium compound.

Into a flask flushed with argon were placed 25.8 g of aluminum tri-o-cresoxide and 200 ml of di-n-butyl ether. To the resulting solution, after having been heated to 50° C., was added dropwise with stirring 0.247 mole (200 ml of a di-n-butyl ether solution) of n-butylmagnesium chloride over a period of 1 hour and 45 minutes. After completion of the addition, the mixture was further reacted for 2 hours at 50° C. The reaction mixture was cooled to room temperature and filtered through a glass filter to collect a white powder. The white powder was washed twice with 200 ml of n-heptane and dried in vacuo to yield 28.2 g of a powder having good flowability. The powder contained 14.6, 8.3, and 0.2% by weight of chlorine, magnesium, and aluminum, respectively.

(2) Synthesis of solid catalyst component.

To 5 g of the magnesium compound obtained above in (1) was added 50 ml of a toluene solution containing 90 mmoles of phenol and 6.3 mmoles of ethyl benzoate. The mixture was allowed to react at 60° C. for one hour. After completion of the reaction, the reaction product was collected by filtration and dried in vacuo. A portion of the resulting product was examined by infrared absorption spectroscopy (Nujol method using thoroughly dehydrated Nujol mull). An absorption due to the phenolic hydroxyl group was observed at 3400 cm$^{-1}$ and another absorption due to the carbonyl group of ethyl benzoate at 1680 cm$^{-1}$, indicating that the reaction product was a magnesium compound to which phenol or o-cresol and ethyl benzoate had been chemically added.

To the addition product obtained above was added 25 ml of titanium tetrachloride. The mixture was allowed to react for 2 hours at 100° C. After completion of the reaction, the reaction product was washed thoroughly with n-heptane until the washings no longer showed the presence of titanium tetrachloride to obtain a solid catalyst component which was then dried. Upon analysis, the titanium content of the dried product was found to be 3.6% by weight.

(3) Polymerization of propylene.

Into a 100-liter stainless steel autoclave flushed with propylene were charged 100 mmoles of triethylaluminum, 100 mmoles of diethylaluminum chloride, 50 mmoles of ethyl p-anisate, 40 liters of n-hexane, and 0.432 g of the solid catalyst component obtained above in (2). After charging 27.5 liters (standard state) of hydrogen, propylene was fed and the polymerization was continued for 4 hours at 70° C., while maintaining gage pressure at 8 kg/cm$^2$ by the replenishment with propylene. At the end of predetermined polymerization time, the polymerization was terminated by the addition of water and the residual gas was purged. The polymer powder was separated from the hexane-soluble polymer. There were obtained 10.25 kg of a dry polymer powder having [$\eta$] (intrinsic viscosity in tetralin at 135° C.) of 1.75 dl/g, a boiling heptane extraction residue (II) of 97.7%, and a bulk density of 0.42 g/ml, and 179 g of a solvent-soluble polymer. The yield of polymer powder (HIP) was 98.3%. The polymerization activities per g of solid catalyst [R(Y)] and per g of titanium [R(Ti)] were 24,100 g polypropylene per g catalyst and 669,000 g polypropylene per g titanium, respectively.

EXAMPLES 2 TO 12 AND COMPARATIVE EXAMPLES 1 TO 3

(1) A mixture of 5 g of the magnesium compound obtained above in Example 1-(1), a phenol, and an aromatic ester, as shown in Table 1, was allowed to react in 50 ml of toluene as solvent at 100° C. for one hour. After completion of the reaction, the reaction product was allowed to react with titanium tetrachloride as in Example 1-(2). The reaction product was thoroughly washed with purified n-heptane and dried in vacuo to obtain a titanium-containing solid catalyst component.

(2) Polymerization of propylene.

Into a 2.0-liter stainless steel autoclave flushed with propylene, were charged 4 mmoles of triethylaluminum, 4 mmoles of diethylaluminum chloride, 2 mmoles of ethyl p-anisate, and 600 ml of thoroughly dehydrated and purified n-heptane followed by 35 to 40 mg of the solid catalyst component obtained above in (1). After charging 148 ml (standard state) of hydrogen, the internal temperature of the autoclave was elevated to 60° C. and the feeding of propylene was then started. The polymerization was continued at 70° C. for one hour, while maintaining the internal pressure of autoclave at 6 kg/cm$^2$ (gage) with propylene. After the predetermined time, the polymerization was terminated with 3 ml of ethanol and the unreacted propylene was purged. The polymer slurry was diluted with 600 ml of n-heptane heated at 60° C. The polymer powder was separated by centrifugation and dried in vacuo at 50° C. The solution separated by the centrifugation was concentrated to recover a solvent-soluble polymer. The results obtained were as shown in Table 1.

TABLE 1

| | Preparation of solid catalyst component | | | | Polymerization result [6 kg/cm$^2$ (gage), 70° C., 1 hour] | | | | | Bulk density |
|---|---|---|---|---|---|---|---|---|---|---|
| | Phenol | | Aromatic ester | | Ti wt % | R(Y) g/g | R(Ti) g/g | HIP % | II % | g/ml |
| Example No. | | mmole | | mmol | | | | | | |
| 2 | Phenol | 90 | Ethyl benzoate | 6.0 | 3.0 | 8750 | 292000 | 98.7 | 97.0 | 0.40 |
| 3 | Phenol | 30 | Ethyl benzoate | 4.2 | 2.7 | 6610 | 245000 | 98.2 | 96.1 | 0.36 |
| 4 | p-Cresol | 30 | Ethyl benzoate | 4.2 | 2.9 | 7050 | 243000 | 98.5 | 96.5 | 0.39 |
| 5 | m-Cresol | 30 | Ethyl benzoate | 4.2 | 3.2 | 6800 | 213000 | 98.0 | 96.7 | 0.38 |
| 6 | o-Cresol | 30 | Ethyl benzoate | 4.2 | 2.5 | 4620 | 185000 | 97.2 | 96.0 | 0.41 |
| 7 | 2,4-Dimethylphenol | 40 | Ethyl benzoate | 3.5 | 3.0 | 4590 | 153000 | 97.6 | 96.2 | 0.38 |
| 8 | 3,4-Dimethylphenol | 40 | Ethyl benzoate | 3.5 | 3.1 | 6750 | 218000 | 97.9 | 96.7 | 0.39 |
| 9 | α-Naphthol | 40 | Ethyl benzoate | 3.5 | 3.3 | 6530 | 198000 | 98.0 | 96.5 | 0.43 |
| 10 | Phenol | 30 | Ethyl p-anisate | 4.2 | 3.5 | 6910 | 197000 | 97.5 | 96.0 | 0.37 |
| 11 | Phenol | 30 | Ethyl p-toluate | 4.2 | 3.3 | 6500 | 197000 | 98.5 | 97.0 | 0.39 |
| 12 | Phenol | 30 | Methyl p-toluate | 4.2 | 3.0 | 6450 | 215000 | 98.2 | 97.1 | 0.40 |
| Comparative Example No. | | | | | | | | | | |
| 1 | — | — | — | — | 3.8 | 3380 | 88900 | 95.0 | 94.0 | 0.34 |
| 2 | Phenol | 30 | — | — | 5.0 | 4700 | 94000 | 95.3 | 94.5 | 0.33 |
| 3 | — | — | Ethyl benzoate | 4.2 | 3.9 | 3520 | 90300 | 97.4 | 95.6 | 0.35 |

EXAMPLE 13

(1) Synthesis of magnesium compound.

A magnesium compound in white powder form was obtained by the reaction of n-butylmagnesium chloride and aluminum tri-o-cresoxide in the same manner as in Example 1-(1), except that diethyl ether was used as solvent in place of the di-n-butyl ether and the reaction temperature was the boiling point of diethyl ether. The resulting powder was found to contain 15.3%, 7.2%, and 0.4% by weight of chlorine, magnesium, and aluminum, respectively.

(2) Synthesis of solid catalyst component.

A mixture of 5 g of the magnesium compound obtained above in (1), 30 mmoles of phenol, and 4.2 mmoles of ethyl benzoate was allowed to react in 50 ml of toluene at 100° C. for one hour. In the same manner as in Example 1-(2), the reaction product was allowed to react with titanium tetrachloride, then washed and dried to obtain a solid catalyst component containing 3.0% by weight of titanium.

(3) Polymerization of propylene.

Propylene was polymerized under the same conditions as in Examples 2 to 12. The catalytic activity was as follows: $R(Y)=6,990$ g polypropylene per g catalyst; $R(Ti)=233,000$ g polypropylene per g titanium. The yield of polymer powder (HIP) was 98.1%.

COMPARATIVE EXAMPLE 4

A solid catalyst component (3.1% by weight titanium content) was prepared in the same manner as in Example 13-(2), except that the ethyl benzoate was not used. The polymerization of propylene was carried out under the same conditions as in Examples 2 to 12. The catalytic activity was found to be as follows: $R(Y)=2,600$ g polypropylene per g catalyst; $R(Ti)=83,900$ g polypropylene per g titanium. The yield of polymer powder (HIP) was 95.0%.

EXAMPLE 14

Ethylene was polymerized using the titanium-containing solid catalyst component of Example 3.

Into a 2.0-liter stainless steel autoclave flushed with ethylene, was charged 4 mmoles of triethylaluminum, 32.0 mg of the solid catalyst component, and 600 ml of n-heptane. After charging hydrogen to a partial pressure of 3.0 kg/cm² at 70° C., ethylene was polymerized at 70° C. for one hour, while maintaining the total pressure at 6 kg/cm² (gage) with ethylene. After the predetermined time, the polymerization was terminated with 3 ml of ethanol and the unreacted ethylene was purged. The polyethylene powder was collected by centrifugation and dried to obtain 346.12 g of a powder of the following properties: $[\eta]=2.17$ dl/g; bulk density=0.34 g/ml; the ratio of weight average molecular weight to number average molecular weight, Mw/Mn=10.7. The catalytic activity was as follows: $R(Y)=10,800$ g polyethylene per g catalyst; $R(Ti)=400,000$ g polyethylene per g titanium.

COMPARATIVE EXAMPLE 5

A titanium-containing solid catalyst component was synthesized in the same manner as in Example 3, except that the magnesium compound was replaced by o-cresoxymagnesium chloride synthesized from n-butylmagnesium chloride and o-cresol in di-n-butyl ether used as solvent. The resulting catalyst component was found to contain 3.0% by weight of titanium. Ethylene was polymerized using this solid catalyst component under the same conditions as in Example 14. A polyethylene of the following properties was obtained: $[\eta]=2.40$ dl/g; bulk density=0.32 g/ml. The catalytic activity was as follows: $R(Y)=4,600$ g polyethylene per g catalyst; $R(Ti)=153,000$ g polyethylene per g titanium.

EXAMPLE 15

(1) Synthesis of magnesium compound.

Into a flask flushed with argon, were charged 13.9 g of aluminum tri-o-cresoxide and 60 ml of toluene. To the resulting solution heated to 100° C. was added dropwise with stirring 0.13 mole of n-butylmagnesium chloride (58 ml of a di-n-butyl ether solution) over a period of 30 minutes. After the addition, the mixture was allowed to react at 100° C. for additional 2 hours. The reaction mixture was cooled to room temperature and filtered through a glass filter to collect a white powder which was then washed three times with 100 ml of n-hexane.

(2) Synthesis of solid catalyst component.

To the whole of the magnesium compound obtained above in (1) was added 60 ml of a toluene solution containing 264 mmoles of phenol and 18.5 mmoles of ethyl benzoate. The mixture was allowed to react at 100° C. for one hour. After completion of the reaction, the solid product was collected by filtration. To the solid product were added successively 150 ml of chlorobenzene and 70 ml of titanium tetrachloride. The mixture was allowed to react at 100° C. for 2 hours. After completion of the reaction, the solid product was washed at 60° to 70° C. repeatedly with n-heptane until the washings had given no test for titanium tetrachloride to obtain a solid catalyst component. After drying, it was found by analysis to contain 3.8% by weight of titanium.

(3) Copolymerization of propylene and ethylene.

Into a 100-liter stainless steel autoclave flushed with propylene were charged 100 mmoles of triethylaluminum, 100 mmoles of diethylaluminum chloride, 50 mmoles of ethyl p-anisate, 40 liters of n-hexane, and 0.512 g of the solid catalyst component obtained above in (2). After charging 16.1 liters (standard state) of hydrogen, propylene was polymerized at 70° C. for 4 hours at a total pressure of 8 kg/cm² (gage) which was maintained by replenishing with propylene. While keeping the temperature at 70° C., the unreacted propylene was purged to a pressure of 0.1 kg/cm² (gage), and hydrogen was charged to a pressure of 2 kg/cm² (gage) and then ethylene to a pressure of 4 kg/cm² (gage). Ethylene was then polymerized for one hour and 40 minutes, while maintaining total pressure at 4 kg/cm² (gage) by the replenishment with ethylene. The polymerization was then terminated with water and the residual gas was purged. The polymer powder was separated from the solvent-soluble polymer to obtain 11.51 kg of a polymer powder $\{[\eta]=1.98$ dl/g; ethylene unit content=36.5% by weight; bulk density=0.42 g/ml} and 226 g of a solvent-soluble polymer. The yield of polymer powder (HIP) was 98.1%. The catalytic activity was as follows: $R(Y)=22,900$ g polymer per g catalyst; $R(Ti)=603,000$ g polymer per g titanium. As shown in Table 2, the particle size distribution, as determined by vibrating sieves, was narrow, the fine particle content being low.

TABLE 2

| Mesh of sieve | 325 | 200 | 150 | 100 | 42 | 28 | 16 | 10 |
|---|---|---|---|---|---|---|---|---|
| Cumulative % by weight of material passed through each | 0 | 0.18 | 0.61 | 1.5 | 8.2 | 22.5 | 80.1 | 99.5 |

TABLE 2-continued

| Mesh of sieve | 325 | 200 | 150 | 100 | 42 | 28 | 16 | 10 |
|---|---|---|---|---|---|---|---|---|
| sieve | | | | | | | | |

The physical properties of the copolymer obtained were found to be as follows: Vicat softening point, 88° C.; modulus of elasticity in flexure, 10,300 kg/cm$^2$; gloss, 92%; haze, 67%; impact clouding, good. The tests were performed on a pressed sheet of 1 mm in thickness for Vicat softening point and modulus of elasticity and on an injection molded sheet of 1.2 mm in thickness for gloss and haze.

What is claimed is:

1. A solid catalyst component for olefin polymerization comprising a titanium compound and/or a vanadium compound supported on a solid product derived from the reaction of a phenol, an aromatic carboxylate ester, and a solid reaction product of an organomagnesium compound and an aryloxyaluminum compound represented by the general formula Al(OR$^1$)$_3$, wherein R$^1$ represents an aryl group having 6 to 20 carbon atoms.

2. A solid catalyst component according to claim 1, wherein the solid reaction product of an organomagnesium compound and an aryloxyaluminum compound contains 0.01 to 2% by weight of aluminum.

3. A solid catalyst component according to claim 1, wherein the solid product derived from the reaction of a phenol, an aromatic carboxylate ester, and a solid reaction product is a compound which shows the stretch vibration of phenolic hydroxyl group at 3,200 to 3,600 cm$^{-1}$ in the infrared absorption spectrum.

4. A solid catalyst component according to claim 1, wherein the organomagnesium compound is a Grignard compound represented by the general formula R$^2$MgCl, wherein R$^2$ represents a hydrocarbon group having 1 to 20 carbon atoms.

5. A solid catalyst component according to claim 4, wherein the Grignard compound is n-butylmagnesium chloride, ethylmagnesium chloride, pentylmagnesium chloride, or octylmagnesium chloride.

6. A solid catalyst component according to claim 1, wherein the aryloxyaluminum compound is tricresoxyaluminum, triphenoxyaluminum, or a mixture thereof.

7. A solid catalyst component according to claim 1, wherein the phenol is phenol, m-cresol, p-cresol, 3,4-dimethylphenol, 3,5-dimethylphenol, m-ethylphenol, p-ethylphenol, p-propylphenol or p-butylphenol.

8. A solid catalyst component according to claim 1, wherein the aromatic carboxylate ester is methyl benzoate, ethyl benzoate, propyl benzoate, butyl benzoate, phenyl benzoate, methyl p-methylbenzoate, butyl p-methylbenzoate, cyclohexyl p-methylbenzoate, ethyl o-methylbenzoate, or phenyl p-butylbenzoate.

9. A solid catalyst component according to claim 1, wherein the titanium compound is a tetravalent titanium compound.

10. A solid catalyst component according to claim 9, wherein the tetravalent titanium compound is titanium tetrachloride.

11. A solid catalyst component according to claim 1, wherein the vanadium compound is vanadium tetrachloride or vanadium oxytrichloride.

* * * * *